(12) United States Patent
Chin et al.

(10) Patent No.: US 9,037,909 B2
(45) Date of Patent: May 19, 2015

(54) TEST APPARATUS

(71) Applicants: Inventec (Pudong) Technology Corporation, Shanghai (CN); INVENTEC CORPORATION, Taipei (TW)

(72) Inventors: Chih-Jen Chin, Taipei (TW); Yu-Shu Lu, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 155 days.

(21) Appl. No.: 13/785,245

(22) Filed: Mar. 5, 2013

(65) Prior Publication Data

US 2014/0122938 A1 May 1, 2014

(30) Foreign Application Priority Data

Oct. 30, 2012 (CN) .......................... 2012 1 0423883

(51) Int. Cl.
*G06F 11/00* (2006.01)
*G06F 11/273* (2006.01)

(52) U.S. Cl.
CPC .................... *G06F 11/273* (2013.01)

(58) Field of Classification Search
USPC .............................................. 714/27, 30, 43
See application file for complete search history.

(56) References Cited

U.S. PATENT DOCUMENTS

| | | | |
|---|---|---|---|
| 6,633,832 B1* | 10/2003 | Browen | 702/186 |
| 6,687,855 B1* | 2/2004 | Krech et al. | 714/30 |
| 6,915,343 B1* | 7/2005 | Brewer et al. | 709/224 |
| 7,346,814 B2* | 3/2008 | Tsai et al. | 714/55 |
| 7,372,288 B2* | 5/2008 | Takemoto | 324/762.02 |
| 7,643,958 B2* | 1/2010 | Grimes et al. | 702/122 |
| 7,895,472 B2* | 2/2011 | Quach et al. | 714/27 |
| 2008/0242152 A1* | 10/2008 | Yeh et al. | 439/625 |
| 2012/0144181 A1* | 6/2012 | Lin | 713/2 |
| 2013/0268708 A1* | 10/2013 | Huang et al. | 710/301 |
| 2013/0305089 A1* | 11/2013 | Wu | 714/27 |

* cited by examiner

*Primary Examiner* — Yolanda L Wilson
(74) *Attorney, Agent, or Firm* — Tim Tingkang Xia, Esq.; Morris, Manning & Martin, LLP

(57) ABSTRACT

A test apparatus for a server includes a first connection unit coupled to a mother board of the server, a second connection unit coupled to a device under test, a data transmission unit, a processing unit, and a network unit. According to a selection signal, the data transmission unit switches one of data transmission modes to perform data transmission between the first connection unit and the second connection unit. The processing unit controls the data transmission unit to perform a first test program for the mother board through the first connection unit, or perform a second test program for the device under test through the first connection unit and the second connection unit. The network unit receives a control signal generated by an external apparatus, so that the external apparatus controls the processing unit to perform the first test program and the second test program through the network unit.

7 Claims, 2 Drawing Sheets

TEST APPARATUS

CROSS-REFERENCE TO RELATED APPLICATIONS

This non-provisional application claims priority under 35 U.S.C. §119(a) on Patent Application No(s). 201210423883.8 filed in China, P.R.C. on Oct. 30, 2012, the entire contents of which are hereby incorporated by reference.

BACKGROUND

1. Technical Field of the Invention

The disclosure relates to a test apparatus, and more particularly to a test apparatus configured for a server.

2. Description of the Related Art

A peripheral component interconnection express (PCIE) interface is a computer data transmission interface widely applied in servers or computer systems. Moreover, the data transmission interface is always disposed on a mother board of a server or a computer system to perform data transmission.

After the server or computer system is manufactured, the PCIE interface on the mother board is generally tested to determine whether the data transmission interface configured on the mother board and a function card having the PCIE interface are capable of performing data transmission normally.

For the mother board and the function card having the PCIE interface such as a network card, a display card or a sound card, however, tests need to be performed respectively. Consequently, it is impossible to perform a bidirectional test on the mother board and the functional card simultaneously, so that the test is to some extent inconvenient and difficult. Therefore, there is still room for improvement for the test on the PCIE interface of the server.

SUMMARY OF THE INVENTION

An embodiment of the disclosure provides a test apparatus configured for a server. The test apparatus comprises a first connection unit, a second connection unit, a data transmission unit, a processing unit, and a network unit. The first connection unit is configured for being coupled to a mother board of the server. The second connection unit is configured for being coupled to a device under test. The data transmission unit is coupled to the first connection unit and the second connection unit. The data transmission unit is configured for switching one of a plurality of data transmission modes according to a selection signal. Thereby, data transmission is performed between the first connection unit and the second connection unit. The processing unit is coupled to the data transmission unit. The processing unit is configured for controlling the data transmission unit, so as to perform a first test program for mother board the through the first connection unit or perform a second test program for the device under test through the first connection unit and the second connection unit. As a result, the first connection unit and the second connection unit perform corresponding data transmission. The network unit is coupled to the processing unit, and is configured for being coupled to an external apparatus. The network unit receives a control signal generated by the external apparatus. Hence, the external apparatus controls the processing unit to perform the first test program and the second test program through the network unit.

BRIEF DESCRIPTION OF THE DRAWINGS

The disclosure will become more fully understood from the detailed description given herein below for illustration only, and thus does not limit the disclosure, wherein.

DETAILED DESCRIPTION

Figure 1:
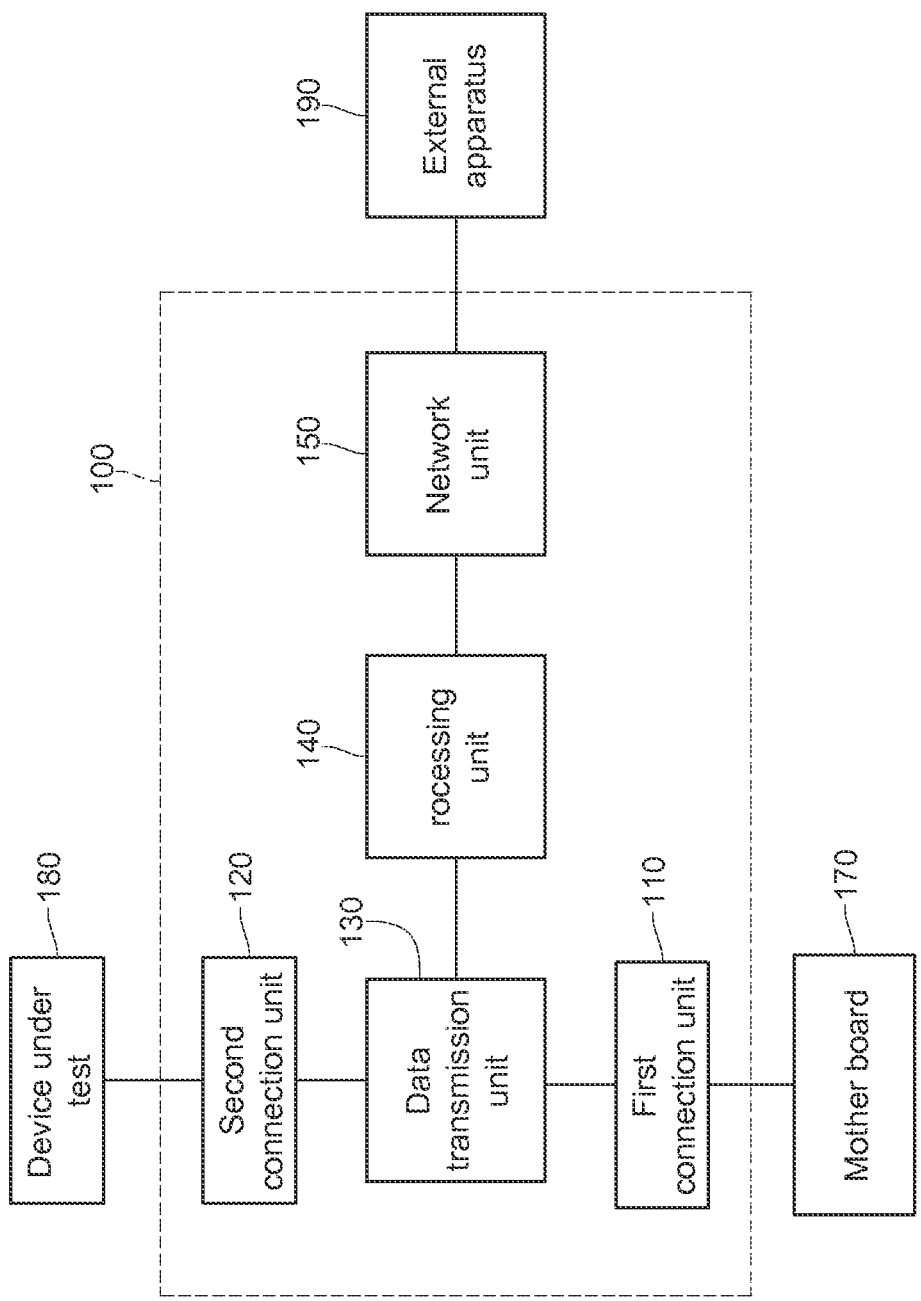
FIG. 1 is a block diagram of a test apparatus according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In embodiments hereinafter, identical reference numerals are used to represent identical or similar devices.

Referring to FIG. 1, a block diagram of a test apparatus according to the disclosure is shown. In this embodiment and other embodiments, a test apparatus 100 is a test card, and is configured for a server. That is, the test apparatus 100 is capable of performing a corresponding test operation on the server. The test apparatus 100 comprises a first connection unit 110, a second connection unit 120, a data transmission unit 130, a processing unit 140, and a network unit 150.

The first connection unit 110 is configured for being coupled to a mother board 170. In other words, the mother board 170 is provided with a slot, and the test apparatus 100 is configured for being inserted on the mother board 170 through the first connection unit 110. Thereby, the test apparatus 100 is coupled to the mother board 170.

The second connection unit 120 is configured for being coupled to the device under test 180. In other words, in this embodiment and other embodiments, the second connection unit 120 is configured as a slot, and the device under test 180 is inserted in the second connection unit 120. Thereby the device under test 180 is coupled to the second connection unit 120. In this embodiment and other embodiments, the device under test 180 is a display card, a sound card, or a network card. Therefore, a function test of the device under test 180 is performing a display test, a sound playback test, or a network transmission test according to different types of the device under test 180.

In this embodiment, the first connection unit 110 and the second connection unit 120 each have a peripheral component interconnection express (PCIE) interface corresponding to the mother board 170 and the device under test 180 having the PCIE interfaces respectively.

The data transmission unit 130 is coupled to the first connection unit 110 and the second connection unit 120, and is configured for switching one of a plurality of data transmission modes according to a selection signal. Thereby, data transmission between the first connection unit 110 and the second connection unit 120 is performed.

In this embodiment, the data transmission modes comprise Gen3x4, Gen3x8 and Gen3x16. Therefore, the data transmission unit 130 switches a data transmission mode corresponding to Gen3x4, Gen3x8 or Gen3x16 according to the selection signal. Subsequently, the data transmission unit 130 performs data transmission between the first connection unit 110 and the second connection unit 120 in the Gen3x4, Gen3x8 or Gen3x16 data transmission mode.

The processing unit 140 is coupled to the data transmission unit 130. The processing unit 140 is configured for controlling the data transmission unit 130 to perform a first test program for the mother board 170 through the first connection unit 110, or perform a second test program for the device under test 180 through the first connection unit 110 and the second connection unit 120. Thereby, corresponding data transmission between the first connection unit 110 and the second connection unit 120 is performed.

In this embodiment and other embodiments, the first test program performed by the processing unit 140 for the mother board 170 through the first connection unit 110 comprises a connection test, a bus width test, a bus speed test, a power supply test and the like. For example, the connection test is configured for determining that the first connection unit 110 of the test apparatus 100 is indeed coupled to the slot of the mother board 170. The bus width test and the bus speed test are used for testing a transmission bandwidth and a transmission speed of the slot of the mother board 170. The power supply test is used for testing whether the power supply of the mother board 170 is normal.

The first test program is a necessary test performed on pins of slots on the mother board 170, so as to ensure that both data transmission and power supply are operating normally. Additionally, in this embodiment and other embodiments, a user is able to add tests for functions such as system management bus and data transmission pressure when setting the test apparatus 100. Thus, the test program for the mother board 170 to the pins becomes more completed. The system management bus test is configured for testing other devices, having known addresses, on the mother board 170. The data transmission pressure test is configured for testing whether the slot of the mother board 170 is capable of working normally after successive and large amount of data transmission.

In this embodiment and other embodiments, the processing unit 140 obtains a data transmission speed and width of the slot of the mother board 170 after completing the first test program for the mother board 170. The processing unit 140, in this embodiment and other embodiments, further controls the data transmission unit 130 to be switched to perform the second test program for the device under test 180 through the first connection unit 110 and the second connection unit 120.

In this embodiment and other embodiments, the second test program performed by the processing unit 140 for the mother board 170 through the first connection unit 110 comprises a system management bus test, a bus width test, a bus speed test and a function test of the device under test 180. For example, the bus width and bus speed tests are configured for testing the data transmission width and speed of the device under test 180. The system management bus test is configured for, for example, testing other devices, whose addresses have been known, of the device under test 180.

Furthermore, in this embodiment and other embodiments, the function test of the device under test 180 differs in accordance with different device under tests 180. In this embodiment and other embodiments, the device under test 180 is a display card, a sound card, or a network card. Therefore, the function test of the device under test 180 is configured for performing a display test, a sound playback test or a network transmission test when required, in accordance with the different types of the device under test 180. In this embodiment and other embodiments, test data for performing the second test program is configured for being transmitted by the mother board 170 to the device under test 180 through the first connection unit 110, the data transmission unit 130 and the second connection unit 120 of the test apparatus 100.

The device under test 180 receives the test data, so as to perform a relevant test and generate a corresponding test result. Moreover, in this embodiment and other embodiments, the test result is transmitted by the device under test 180 to the mother board 170 through the second connection unit 120, the data transmission unit 130 and the first connection unit 110.

The network unit 150 is coupled to the processing unit 140, and is configured for being coupled to an external apparatus 190. In this embodiment and other embodiments, the external apparatus 190 is a remote server. Moreover, in this embodiment and other embodiments, the network unit 150 is a network connection port, for example, RJ45. The network unit 150 receives a control signal generated by the external apparatus 190 and thereby makes the external apparatus 190 to control the processing unit 140 through the network unit 150. Subsequently, the first test program and the second test program are performed by the processing unit 140.

Therefore, in this embodiment and other embodiments, in addition to performing the test on the server locally, the user further performs operations of monitoring and test on the server remotely through the network unit 150. Thereby, the convenience of the test is improved.

Figure 2:
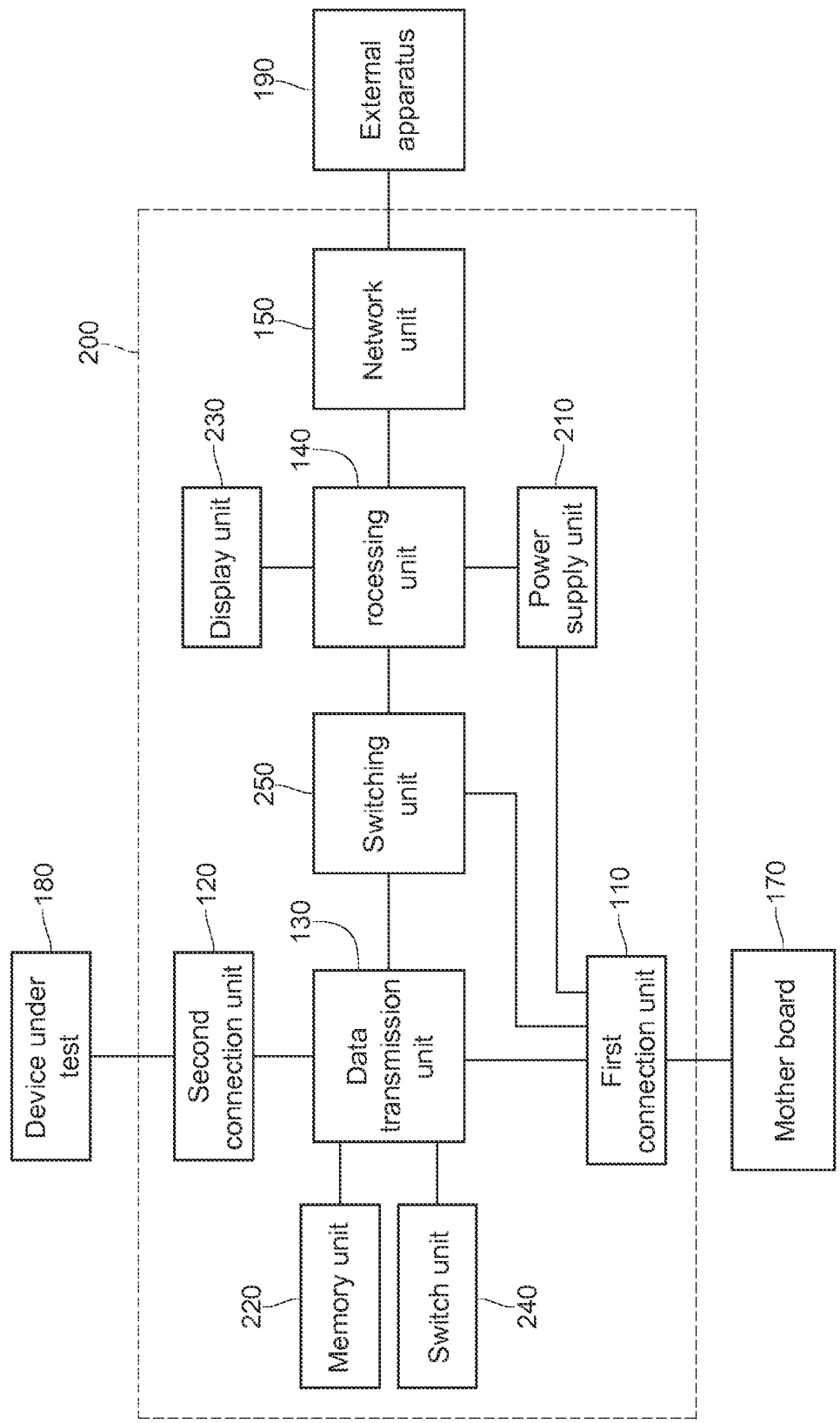
FIG. 2 is a block diagram of another test apparatus according to the disclosure.

Please refer to FIG. 2. FIG. 2 is a block diagram of another test apparatus according to the disclosure. A test apparatus 200 comprises a first connection unit 110, a second connection unit 120, a data transmission unit 130, a processing unit 140, a network unit 150, a power supply unit 210, a memory unit 220, a display unit 230, a switch unit 240, and a switching unit 250. In this embodiment and other embodiments, coupling relationships and relevant operations of the first connection unit 110, the second connection unit 120, the data transmission unit 130, the processing unit 140, and the network unit 150 are obtained with reference to the description of the embodiment in FIG. 1, and thus are not repeated herein.

The power supply unit 210 is coupled to the processing unit 140 and the first connection unit 110, and the first connection unit 110 is further coupled to a power supply of the mother board 170. Therefore, when the test apparatus 200 is inserted on the mother board 170, the power supply unit 210 obtains a working voltage provided by the mother board 170 through the first connection unit 110. Furthermore, the power supply unit 210 provides the working voltage to the processing unit 140, so as to enable the processing unit 140 to perform operation.

The memory unit 220 is coupled to the data transmission unit 130. The memory unit 220 is configured for storing a plurality of data transmission modes corresponding to the data transmission unit 130. As a result, after receiving a selection signal, the data processing unit 140 obtains the corresponding data transmission mode through from the memory unit 220 according to the selection signal. Subsequently, the data processing unit 140 switches the data transmission mode to the corresponding data transmission mode. Thereby, data transmission between the first connection unit 110 and the second connection unit 120 is performed.

The display unit 230 is coupled to the processing unit 140, and is configured for displaying an operation state of the processing unit 140. In this embodiment and other embodiments, the display unit 230 is a light emitting diode, a seven-segment display, or a liquid crystal display. For example, the processing unit 140 generates a corresponding first display signal or second display signal, according to a first test program or a second test program. Then, the display unit 230 generates a display state corresponding to the first display signal or second display signal. Consequently, the user is able to realize that the test apparatus 200 performs the test with the first test program or the second test program through the display state of the display unit 230.

The switch unit 240 is coupled to the data transmission unit 130, and is configured for generating the selection signal. In this embodiment and other embodiments, the switch unit 240 is a dip switch. Thus, the user is capable of adjusting a switch position on the dip switch to generate different selection signals. Thereby, data transmission unit 130 is switched to the corresponding data transmission mode according to the corresponding selection signal, so as to perform the operation of data transmission.

The switching unit 250 is coupled to the data transmission unit 130, the processing unit 140 and the first connection unit 110. The switching unit 250 is configured for switching the data transmission unit 130 to be coupled to the first connection unit 110 or switching the data transmission unit 130 to be coupled to the processing unit 140, based on a first switching signal generated by the processing unit 140 or a second switching signal generated by the first connection unit 110.

In this embodiment, the switching unit 250 is coupled to a baseboard management board (BMC) of the mother board 170 through the first connection unit 110. Moreover, the BMC sends a control signal through the first connection unit 110 to control the data transmission unit 130 to perform the first test program or second test program.

Therefore, in this embodiment and other embodiments, when the user is at the local side of the server, the user sends the second switching signal through the BMC, and transmits the second switching signal to the switching unit 250 through the first connection unit 110. Thus, the switching unit 250 is configured for switching the data transmission unit 130 to be coupled to the first connection unit 110. Hence, the BMC is capable of controlling the data transmission unit 130 to perform the first test program or second test program.

In this embodiment and other embodiments, when the user is not at the local side of the server, the user operates the external apparatus 190 coupled through the network unit 150, to generate the control signal. Subsequently, the control signal is transmitted to the processing unit 140 through the network unit 150. The processing unit 140 correspondingly generates the first switching signal to the switching unit 250. Therefore, the switching unit 250 is made to switch the data transmission unit 130 to be coupled to the processing unit 140. As a result, the external apparatus 190 controls the data transmission unit 130 through the processing unit 140, so as to perform the first test program or second test program.

Therefore, in this embodiment and other embodiments, in addition to performing the test on the server locally, the user is able to further performs operations of monitoring and test on the server remotely through the network unit 150. Thereby, the convenience of the test is improved.

In the test apparatus according to the embodiments of the disclosure, the data transmission unit is configured for switching the data transmission mode between the first connection unit and the second connection unit. Furthermore, the processing unit controls the data transmission unit to perform the first test program for the mother board through the first connection unit or perform the second test program for the device under test through the first connection unit and the second connection unit. In addition, the network unit receives the control signal generated by the external apparatus, so as to control the processing unit to perform the first test program or second test program. Therefore, in addition to performing the test on the server locally, operations of monitoring and test are performed on the server remotely. Thereby, the convenience of the test is improved.

What is claimed is:

1. A test apparatus configured for a server, the test apparatus comprising:
    a first connection unit configured for being coupled to a mother board of the server;
    a second connection unit configured for being coupled to a device under test;
    a data transmission unit coupled to the first connection unit and the second connection unit, and configured for switching one of a plurality of data transmission modes according to a selection signal, so as to transmit data between the first connection unit and the second connection unit according to the selected one of the plurality of data transmission modes;
    a processing unit coupled to the data transmission unit, and configured for controlling the data transmission unit, so as to execute a first test program for the mother board through the first connection unit, or execute a second test program for the device under test through the first connection unit and the second connection unit, so that the first connection unit and the second connection unit transmit the corresponding data; and
    a network unit coupled to the processing unit, and configured for being coupled to an external apparatus, wherein the network unit receives a control signal generated by the external apparatus, so that the external apparatus controls the processing unit to execute the first test program and the second test program through the network unit.

2. The test apparatus according to claim 1, further comprising:
    a power supply unit coupled to the processing unit and the first connection unit, and configured for obtaining a working voltage through the first connection unit and providing the working voltage to the processing unit.

3. The test apparatus according to claim 1, further comprising:
    a memory unit coupled to the data transmission unit, and configured for storing the data transmission modes.

4. The test apparatus according to claim 1, further comprising:
    a display unit coupled to the processing unit, and configured for displaying an operation state of the processing unit.

5. The test apparatus according to claim 1, further comprising:
    a switch unit coupled to the data transmission unit, and configured for generating the selection signal.

6. The test apparatus according to claim 1, further comprising:
    a switching unit coupled to the data transmission unit, the processing unit and the second connection unit, the switching unit configured for switching the data transmission unit to be coupled to the first connection unit or for switching the data transmission unit to be coupled to the processing unit, based on a first switching signal generated by the processing unit or a second switching signal generated by the first connection unit.

7. The test apparatus according to claim 1, wherein the first connection unit and the second connection unit each comprise a peripheral component interconnection express (PCIE) interface.

* * * * *